(12) United States Patent
Shen et al.

(10) Patent No.: US 10,021,661 B2
(45) Date of Patent: Jul. 10, 2018

(54) MESHED GPS TIME SYNCHRONIZED NETWORK

(71) Applicant: AT&T MOBILITY II LLC, Atlanta, GA (US)

(72) Inventors: Yi Shen, Seminole, FL (US); Ye Chen, Milton, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 97 days.

(21) Appl. No.: 14/950,078

(22) Filed: Nov. 24, 2015

(65) Prior Publication Data

US 2017/0150463 A1 May 25, 2017

(51) Int. Cl.
*H04W 56/00* (2009.01)
*H04W 84/18* (2009.01)
*H04W 24/04* (2009.01)

(52) U.S. Cl.
CPC ........ *H04W 56/0015* (2013.01); *H04W 24/04* (2013.01); *H04W 84/18* (2013.01)

(58) Field of Classification Search
CPC ......... H04W 56/0015; H04W 72/0446; H04W 84/18; H04J 3/0688
USPC .................. 370/336, 350; 455/502; 375/356; 709/248
See application file for complete search history.

(56) References Cited

U.S. PATENT DOCUMENTS

| | | | |
|---|---|---|---|
| 8,050,296 B2 | 11/2011 | Osterling | |
| 8,135,043 B2 | 3/2012 | Ogura | |
| 8,279,896 B2 | 10/2012 | Etkin et al. | |
| 8,279,897 B2 | 10/2012 | Lee et al. | |
| 8,699,463 B2 | 4/2014 | Matsumoto | |
| 8,879,536 B2 | 11/2014 | Yu | |
| 8,953,581 B1 | 2/2015 | Charles et al. | |
| 9,055,527 B2 | 6/2015 | Zhang et al. | |
| 9,179,495 B1* | 11/2015 | Scherzer | H04W 52/46 |
| 2006/0034250 A1* | 2/2006 | Kim | H04B 7/2696 370/350 |
| 2009/0238214 A1 | 9/2009 | Hong | |
| 2009/0290572 A1* | 11/2009 | Gonia | H04J 3/0641 370/350 |
| 2011/0090925 A1 | 4/2011 | Blum et al. | |
| 2012/0195253 A1* | 8/2012 | Irvine | H04J 3/0641 370/328 |

(Continued)

OTHER PUBLICATIONS

Symmetricom, "Timing and Synchronization for LTE-TDD and LTE-Advanced Mobile Networks," 2013, White Paper, pp. 1-9.

*Primary Examiner* — Mark H Rinehart
*Assistant Examiner* — Kenneth P Hunt
(74) *Attorney, Agent, or Firm* — Zagorin Cave LLP

(57) ABSTRACT

A system includes a plurality of base stations coupled in a mesh network. A first base station of the plurality of base stations includes a first antenna to receive a primary timing synchronization signal and a first interface to a wired packet-switched communication link. The first base station is configured to transmit backup timing synchronization information based on the primary timing synchronization signal. A second base station of the plurality of base stations has a second interface to the wired packet-based communication link and is configured to utilize the second timing synchronization signal sent from the first base station responsive to a failure of the primary timing synchronization signal at the second base station.

13 Claims, 4 Drawing Sheets

(56) References Cited

U.S. PATENT DOCUMENTS

| | | |
|---|---|---|
| 2013/0157593 A1 | 6/2013 | Achanta |
| 2014/0149526 A1 | 5/2014 | Magee et al. |
| 2014/0198783 A1* | 7/2014 | Qi .................. H04W 56/00 370/350 |
| 2015/0092738 A1 | 4/2015 | Chakraborty et al. |
| 2015/0113174 A1* | 4/2015 | Yang ................ H04L 69/28 709/248 |
| 2015/0319801 A1* | 11/2015 | Lee ................. H04W 56/00 370/329 |
| 2016/0249311 A1* | 8/2016 | Yu .................. H04W 4/005 |
| 2016/0286510 A1* | 9/2016 | Soulhi ............... H04L 63/10 |
| 2017/0273054 A1* | 9/2017 | Beitler .............. G01S 5/04 |

\* cited by examiner

MESHED GPS TIME SYNCHRONIZED NETWORK

BACKGROUND

Field of the Disclosure

This application relates to time synchronization and more particularly to backup time synchronization in wireless communication networks.

Description of the Related Art

The current time synchronization design for 4G Long Term Evolution (LTE) networks utilizes satellite based signals, e.g., Global positioning System (GPS) or Global Navigation Satellite System (GNSS), to provide timing signals for synchronization and clock synthesis of fundamental radio frequencies. LTE base stations (eNodeBs), also referred to herein as access points, have their own GPS antennas to achieve GPS synchronization. But GPS signals are subject to interruption from, e.g., storm damage to antennas from wind and/or lightning, or even GPS jamming or other interference. If the GPS signal is lost, the LTE eNodeB will lose its time synchronization. Typical eNodeBs have the capability to maintain an accurate time reference for some amount of time after a synchronization signal failure, e.g., for up to a few hours or even up to a day. After that, once eNodeB is out of synchronization, LTE services will be lost.

In order to provide high quality service to customers, telecommunication operators typically utilize a backup (second priority) time synchronization source. A typical approach is to use the operators' 3G network, such as the Radio Network Controller's (RNC's) time clock as the backup time synchronization source. Although such an approach does provide a backup, the RNC backup approach has limitations since the second time synchronization frames are carried from the RNC over the backhaul and the accuracy of the backup clock could be degraded due to long distance transmission. Further, if the backhaul has an outage, the eNodeB will lose the backup time synchronization source. Another potential troublesome scenario is that if an LTE eNodeB and Universal Mobile Telecommunication System (UMTS) Radio Network Controller (RNC) uses different Internet Protocol (IP) address plans, such as IPv6 for LTE eNodeB, while the UMTS RNC remains IPv4, then it becomes impossible for LTE eNodeB to use the RNC as a backup time synchronization source.

SUMMARY OF EMBODIMENTS

Accordingly, embodiments provide a more robust solution for backup time synchronization. In an embodiment, a method includes receiving backup timing synchronization information at a first base station transmitted over a wired packet-switched communication link from a second of a plurality of base stations coupled to the first base station in a mesh network including the wired packet-switched communication link. The first base station generates a timing signal synchronized with the first base station using the backup timing synchronization information.

In another embodiment, a system includes a plurality of base stations coupled in a mesh network. A first base station of the plurality of base stations includes a first antenna to receive a primary timing synchronization signal and a first interface to a wired packet-switched communication link. The first base station is configured to transmit backup timing synchronization information based on the primary timing synchronization signal. A second base station of the plurality of base stations has a second interface to the wired packet-based communication link and is configured to utilize the backup timing synchronization information sent from the first base station responsive to a failure associated with receipt of the primary timing synchronization signal at the second base station.

In another embodiment, a system includes a plurality of base stations coupled in a mesh network. A first and second antenna associated respectively with a first and second of the plurality of base stations receive a primary timing synchronization signal transmitted from a satellite. The first and second base stations of the plurality of base stations supply first and second backup timing synchronization information over the mesh network on a periodic basis to a third of the plurality of base stations.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

GPS time synchronization has been a mature technology for many applications, such as for LTE (4G) networks, including use for LTE eNodeBs. In order to address the possibility of GPS time synchronization failure, embodiments described herein provide a meshed GPS time synchronization approach for LTE eNodeBs to help provide more robust time synchronization to maintain network stability, and to therefore provide a better end user experiences. Since hardware faults occur simultaneously to GPS antennas on multiple LTE eNodeB sites very rarely, the LTE eNodeB with a failed GPS signal may use the GPS time synchronization source of its neighbor sites as second priority (backup) time synchronization sources. Note that synchronization needs to be maintained for both frequency and phase in advanced LTE systems.

Figure 1:
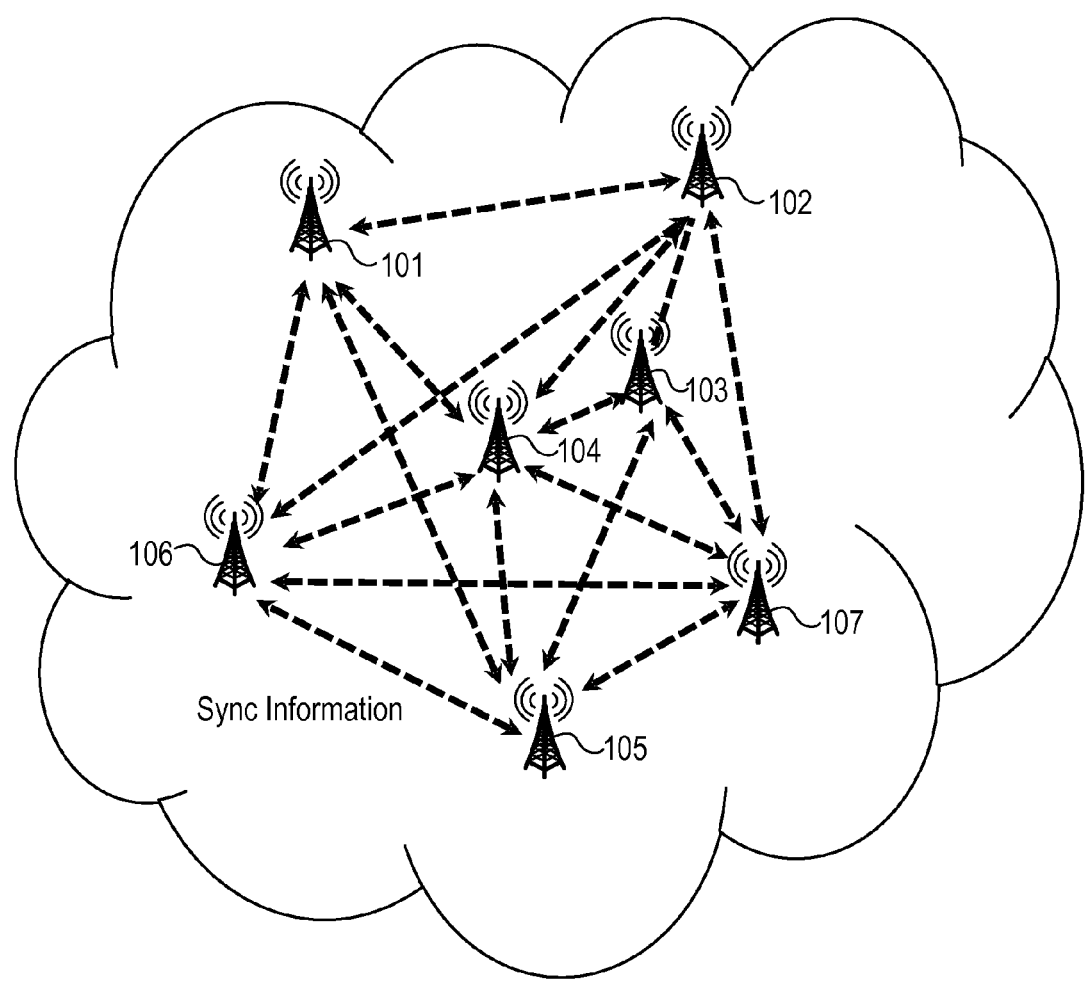
FIG. 1 illustrates a block diagram of a mesh network according to an embodiment.

Referring to FIG. 1, multiple nodes 101-107 are coupled in a mesh network. The nodes may be base stations or eNodeBs of macro cells and the nodes may also include one or more small cells as described further herein. For example, node 104 may be an access point (eNodeB) for a macro cell node and node 103 may be the access point for a small cell within the macro cell served by node 104. In the mesh network illustrated in FIG. 1, node 101 is coupled to nodes 102, 104, 105, and 106. Each of the nodes in the mesh network are configured to receive a satellite signal that provides the primary synchronization signal used for performing the timing functions needed to effectuate communications. The GPS signal is highly accurate allowing the nodes receiving the GPS signal to maintain synchronization with each other. However, as described above, the GPS signals are subject to interruption. In the mesh system 100 of FIG. 1, each enode has multiple nodes from which to receive backup timing synchronization. Any node can receive backup synchronization from any node to which it is connected in the mesh and any node can provide backup synchronization to any node to which it is connected in the mesh.

The 3GPP Specification provides for interconnecting neighboring 4G LTE eNodeBs using Internet Protocol (IP)-based X2 interfaces in order to exchange information related to such activity as handover between cells and to reduce interference. The X2 interface is a logical interface between neighboring eNodeBs specified in Technical Specification ETSI TS 136 420. Thus, the communication paths shown in FIG. 1 may be provided via X2 interfaces coupling neighboring nodes.

Figure 2:
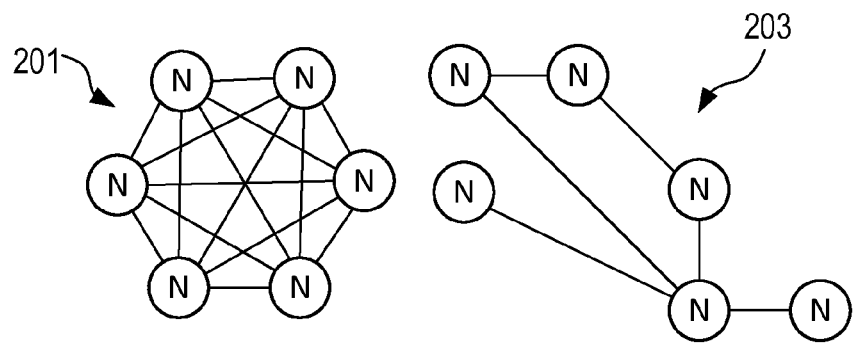
FIG. 2 illustrates various mesh networks.
Figure 3:
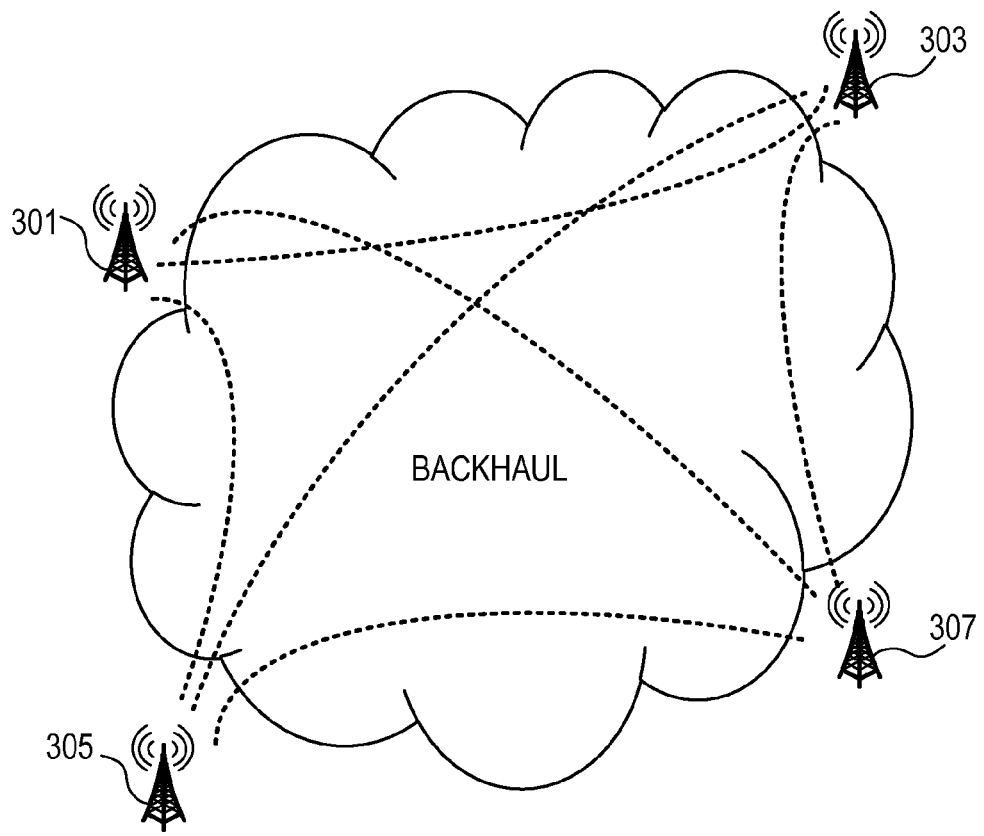
FIG. 3 illustrates a block diagram of a mesh network according to an embodiment.

FIG. 2 illustrates a full mesh network 201 and a partial mesh network 203. In either the full mesh or partial mesh, each node (N) of the network is a peer node and, in contrast to a client/server model in which one node is a client and one node a server, a peer node can supply timing synchronization information to a neighbor node or can receive timing synchronization from the neighbor node. FIG. 3 illustrates an embodiment where base station nodes 301, 303, 305, and 307 are communicatively coupled to each other in a mesh network utilizing backhaul of the telecommunications network as communication paths. In other embodiments, the communications paths may be over localized Ethernet communications paths or any wired communication path capable of carrying packet based synchronization information.

Figure 4:
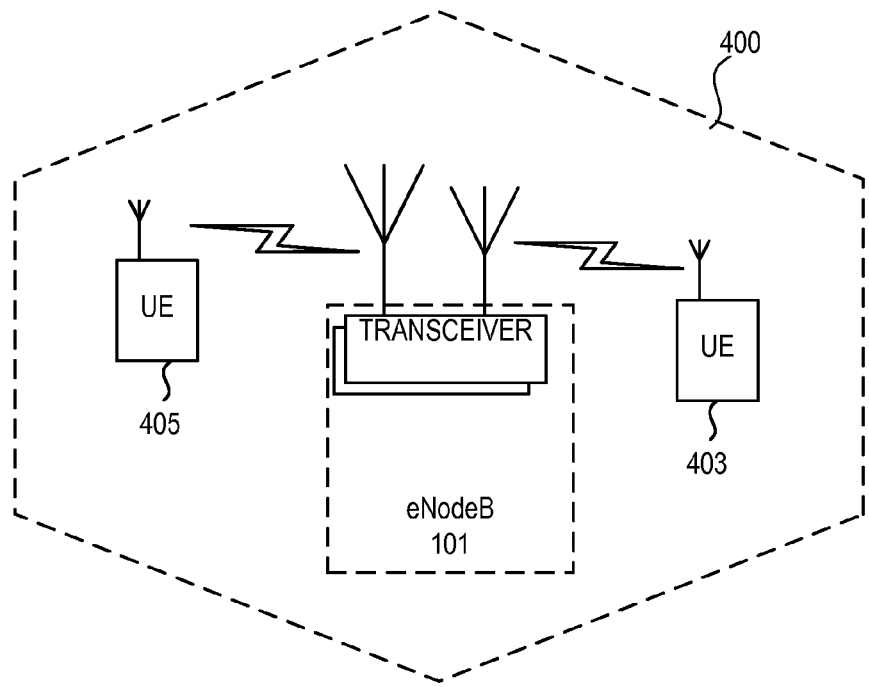
FIG. 4 illustrates a cell served by an eNodeB of FIG. 1.

FIG. 4 illustrates a block diagram of eNodeB 101 serving cell 400 and communicating with User Equipment (UE) 403 and 405. If the eNodeB 101 loses synchronization, the ability to communicate with UEs 403 and 405 is lost.

Figure 5:
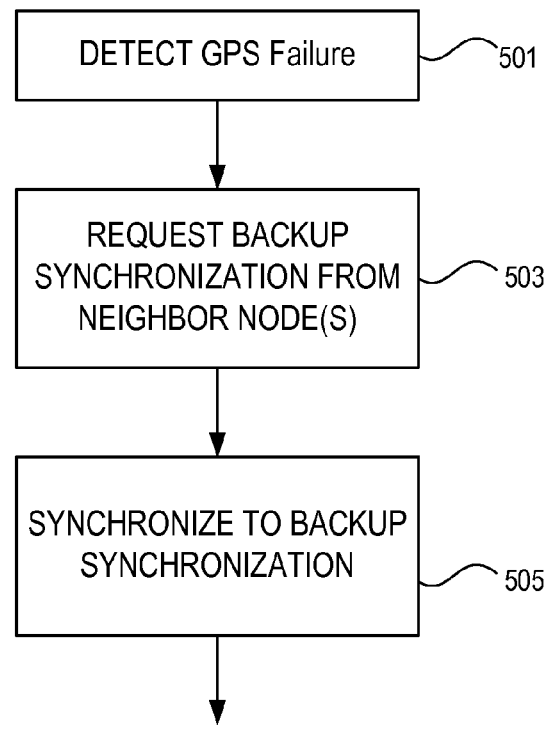
FIG. 5 illustrates a high level flow diagram of system operation for backup synchronization.

Referring again to FIG. 1, assume eNodeB 104 experiences a failure in receiving its primary GPS synchronization signal. FIG. 5 illustrates a flow diagram of how the system works to provide backup synchronization. Referring to FIG. 5, in 501 eNodeB 104 detects a failure associated with receipt of the primary synchronization signal. That failure may be detected, e.g., when the received signal strength of the GPS signal drops below an acceptable threshold thereby indicating a loss of signal. That failure may be caused by a weather event that destroys the GPS antenna. In 503, eNodeB broadcasts to its neighbors on the mesh network, e.g., eNodeBs 101, 102, 103, 105, 106, and 107 a request that the neighbors provide a source for backup time synchronization. In response, neighboring nodes 101, 102, 103, 105, 106, and 107 respond with timing synchronization information based on their primary synchronization signal. In other embodiments, the failing node may multicast in 503 to two or three neighboring nodes requesting timing synchronization or message only one of its neighbors. If a node cannot provide the information due to its own failure or some other reason, the node may not respond, or may respond with a message indicating it cannot provide the backup synchronization information. In still other embodiments, the neighboring node(s) are already providing backup synchronization information and the step in 503 may be omitted. In 505, eNodeB synchronizes its timing signals using the backup timing synchronization information by adjusting the phase and/or frequency of its clock signals in a manner well known in the art.

The backup timing synchronization information can be based on standardized protocols such as Network Time Protocol (NTP) that provides for timing synchronization over a packet-switched network with variable-latency such as the X2 interface providing communication between eNodeBs. Thus, an eNodeB with a failed GPS signal can synchronize its local clocks to one or more eNodeBs with good GPS signals through a packet-switched network. The packets provided containing the timing synchronization information, typically include a time stamp associated with the node sending the backup timing synchronization information. Note that while the X2 interface may be utilized, other packet switched interfaces may be used. Further, note that the backup time synchronization source is not limited to a source operating with the same wireless standard, such as LTE FDD nodes. As long as the NTP time server in the neighboring cell site (for example, the neighbor site could be a CDMA node using a GPS antenna) works with an NTP time client inside the eNodeB, and the two eNodeBs communicate, the backup synchronization can be utilized. The NTP protocol is just an example, and any protocol may be used that is suitable to provide backup synchronization from a close-by neighbor to exploit the GPS signal available to the neighbor node as a backup. It is advantageous to avoid a centralized "timing server" that could be single point of failure. Instead, using meshed neighbors GPS synchronization as backup synchronization sources are cheaper, more cost efficient, and more accurate (due to short distance to the neighbor resulting in shorter packet travel time).

If the eNodeB requiring backup synchronization receives synchronization information from multiple nodes, the eNodeB can utilize the synchronization information from the multiple nodes to improve accuracy. For example, in an embodiment the time synchronization priority list can be defined for multiple time synchronization sources for each eNodeB. For example, the time synchronization sources priority for eNodeB A may be defined to have four priorities as follows. Priority 1 is eNodeB A's own GPS time synchronization. Priority 2 is eNodeB B's GPS time synchronization (via X2) and eNodeB C's GPS time synchronization (via X2). Priority 3 is eNodeB D's GPS time synchronization (via X2) and priority 4 is eNodeB E's GPS time synchronization (via X2). When multiple time synchronization sources have the same priority (like Priority 2 shown above), eNodeB A computes the average timing synchronization value to improve accuracy. In other embodiments each priority level has a single synchronization source, Further, if the eNodeB only wants backup synchronization from one neighbor node and is receiving synchronization information from multiple sources, the eNodeB may send a message to other neighbor nodes that their backup synchronization information is no longer needed. That allows traffic to be reduced by stopping transmission of backup synchronization information that the failing node chooses not to receive.

In an embodiment, the nodes in the mesh network continuously broadcast or multicast backup timing synchronization information. In such an embodiment, a failing node would not have to request backup synchronization information. Instead, the failing node would simply start to utilize the available backup synchronization information already being received. In an embodiment a dynamic time synchronization traffic flow mechanism increases or decreases the frequency of time synchronization packages, depending on such factors as the size of mesh network and/or IP network bandwidth.

The mesh network may include not only macro cells but also small cells. To meet the mobile traffic growth demand and improve the end user experience, mobile service providers are deploying small cells to improve coverage and capacity and reduce the demands on the macro cell. Small cells can be classified into different cell types, such as micro cells, pico cells, femto cells, home eNodeBs, etc. based on their different cell sizes. The cell size of a cell can be determined based on various factors such as, but not limited to, the transmission power of its access point, coverage area, antenna position, location (e.g. rural or city, indoor or outdoor). Typically, an eNodeB serving a macro cell transmits long range high power signals providing many hundreds or thousands of meters of coverage, while the small cells transmit shorter range and lower power signals typically providing tens to hundreds of meters of coverage. The small cells access points, performing the functions of eNodeBs, may be interconnected with other small cells access points and with macro cell eNodeBs and may be able to both receive and provide backup synchronization information upon request.

Note that the approach described herein works for either IPv4 or IPv6 LTE networks. If an eNodeB is migrated from IPv4 to IPv6, since normally the migration happens to a cluster of LTE eNodeBs, even though the newly migrated LTE eNodeBs (running on IPv6) lose the backup time synchronization from the RNC (running on IPv4), newly migrated eNodeBs in the cluster can still can use their IPv6 neighbor sites GPS time synchronization as backup.

Figure 6:
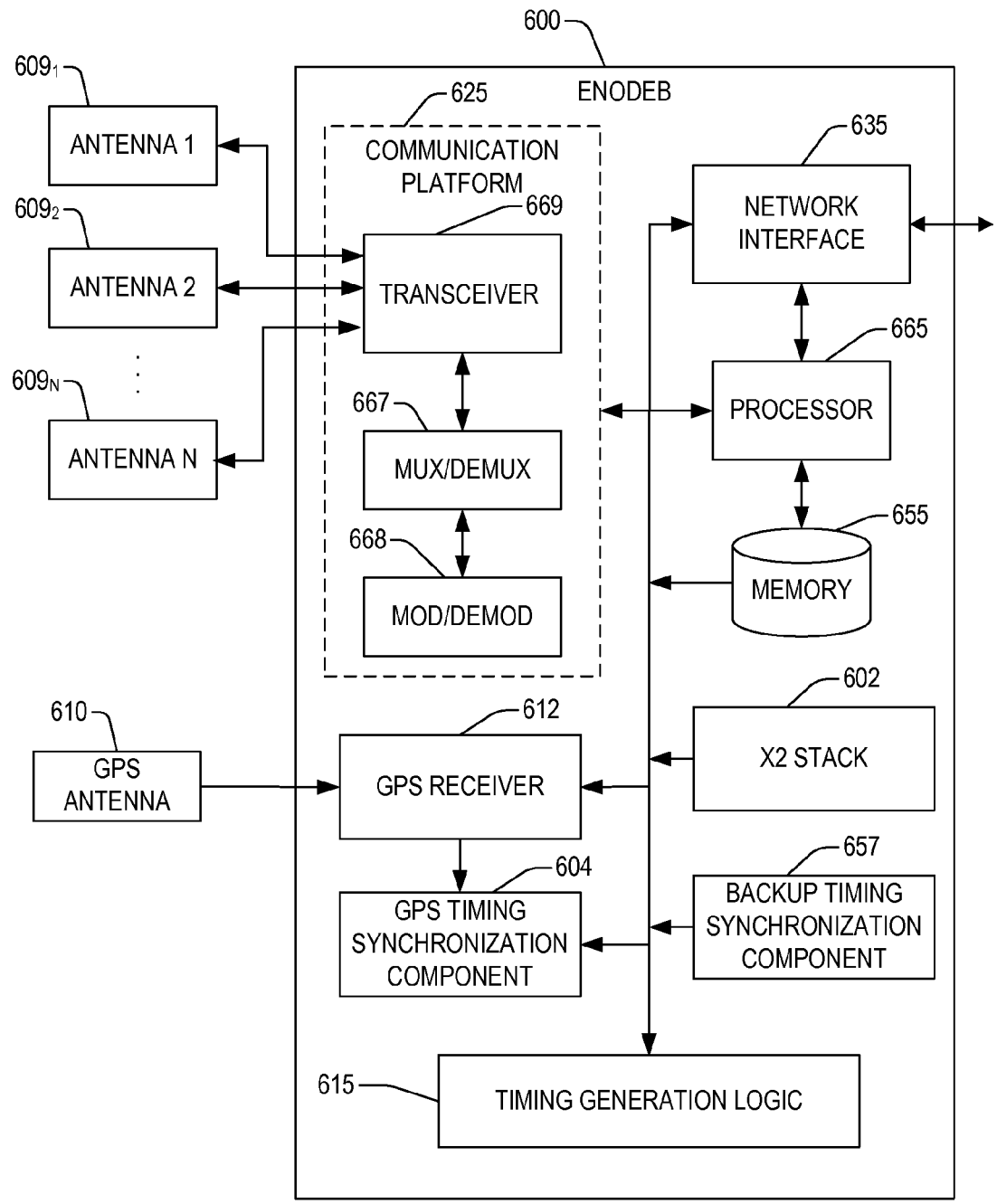
FIG. 6 illustrates a high level block diagram of an access point such as an eNodeB, according to an embodiment.

To provide further context for various aspects of the subject specification, FIG. 6 provides a high level block diagram of an example embodiment 400 of an eNodeB that may be used to implement the backup time synchronization described herein. As an example, the eNodeB 101 shown in FIGS. 1 and 2 (and small cell access points) can each include at least a portion of the embodiment shown in 600. In one aspect, the access point 600 can receive and transmit signal(s) (e.g., traffic and control signals) to and from user equipment, through a set of antennas $609_1$-$609_N$. Antennas $609_1$-$609_N$ form part of communication platform 625, which includes electronic components and associated circuitry for processing received signal(s) (data and control) and for processing signals (data and control) to be transmitted. Communication platform 625 can include a transmitter/receiver (e.g., a transceiver) 669 that can convert signal(s) from analog format to digital format upon reception, and from digital format to analog format for transmission. In addition, transceiver 669 can divide a single data stream into multiple, parallel data streams, or perform the reciprocal operation. Coupled to transceiver 669 is a multiplexer/demultiplexer 667 that facilitates manipulation of signals in the time and/or frequency domain. Multiplexer/demultiplexer 667 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM), etc. In addition, multiplexer/demultiplexer component 667 can scramble and spread information (e.g., codes) according to substantially any code known in the art. A modulator/demodulator 668 is also a part of communication platform 625, and can modulate information according to multiple modulation techniques, such as frequency modulation, amplitude modulation (e.g., M-ary quadrature amplitude modulation (QAM), with M a positive integer), phase-shift keying (PSK), and the like. Access point 600 further includes GPS antenna 610 and GPS receiver 612 that processes the received GPS signal. Timing generation logic 615, that may include one or more oscillators and phase-locked loops (PLLs) to provide appropriate timing signals, e.g., for OFDM or other modulation, and to ensure synchronization with other base stations, based on the GPS signal.

Access point 600 also includes one or more processors 645 configured to confer functionality, at least partially, to substantially any electronic component in the access point 600, in accordance with aspects of the subject disclosure. In particular, processor 645 can facilitate detecting loss of the GPS signal and receipt of backup synchronization information. Processor 645 can also facilitate communication over the network interface 635 coupled to a wired packet-based communication channel as well as implementation of the X2 interface using the X2 stack 602 for communication over the network interface 635. In addition, processor 645 can facilitate processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 645 can manipulate antennas $609_1$-$609_N$ to facilitate beamforming or selective radiation pattern formation, which can benefit specific locations covered by the access point 600; and exploit substantially any other advantages associated with smart-antenna technology. Further, processor 645 may be utilized in processing the GPS signal. Thus, the one or more processors 645 may include digital signal processing capability to effectuate necessary functions associated with reception and transmission of information via antennas $609_1$ to $609_N$ and the receipt of GPS signal from GPS antenna 610. When backup synchronization information is received over network interface 635, it may be processed by the backup timing synchronization component 657 to extract the necessary phase and frequency information from the received packets to adjust the oscillators and/or PLLs found in timing generation logic 615 by evaluating, e.g., the time stamp and delay associated with transmission of the backup timing synchronization information. One or more aspects of backup timing synchronization component 657 may be implemented by the processor 645 executing instructions stored in memory 655.

Memory 655 can store data structures, code instructions, system or device information like device identification codes (e.g., International Mobile Station Equipment Identity (IMEI), Mobile Station International Subscriber Directory Number (MSISDN), serial number . . . ) and specify capabilities; code sequences for scrambling; spreading and pilot transmission, floor plan configuration, access point deployment and frequency plans; and so on. Moreover, memory 655 can store information related to backup synchronization such as nearest neighbors for multicast in case of synchronization failure, generation in the time and frequency domain.

Processor 645 can be coupled to the memory 655 in order to store and retrieve information necessary to operate and/or confer functionality to communication platform 625, network interface 635 (e.g., that couples the access point to other eNodeBs in the mesh network), and other operational components (e.g., multimode chipset(s), power supply sources, etc., not shown) that support the access point 600. In addition, it is to be noted that the various aspects disclosed in the subject specification can also be implemented through (i) program modules stored in a computer-readable storage medium or memory (e.g., memory 655) and executed by a processor (e.g., processor 645), or (ii) other combination(s) of hardware and software, or hardware and firmware.

In the subject specification, terms such as "data store," "data storage," "database," "cache," and substantially any other information storage component relevant to operation and functionality of a component, refer to any form of memory that can store information and be read by computers or processors. Memory may be volatile memory or nonvolatile memory, or both. Nonvolatile memory can include read only memory (ROM), programmable ROM (PROM), electrically programmable ROM (EPROM), electrically erasable ROM (EEPROM), or flash memory. In addition nonvolatile memory can include magnetic and optical memory. Volatile memory can include random access memory (RAM), available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Thus, aspects of backup synchronization have been described. The description set forth herein is illustrative, and is not intended to limit the scope of the following claims. Variations and modifications of the embodiments disclosed herein may be made based on the description set forth herein, without departing from the scope and spirit of the following claims.

What is claimed is:

1. A method comprising:
   a first base station of a plurality of base stations coupled in a mesh network sending a request simultaneously to others of the plurality of base stations coupled to the first base station in the mesh network that backup timing synchronization information be sent from the others of the plurality of base stations to the first base station;
   receiving first backup timing synchronization information at the first base station transmitted over a wired packet-switched communication link on the mesh network from a second base station of the others of the plurality of base stations coupled to the first base station in the mesh network responsive to the request;
   generating a timing signal in the first base station using the first backup timing synchronization information;
   receiving additional backup timing synchronization information at the first base station transmitted over the mesh network from additional base stations of the others of the plurality of base stations; and
   the first base station sending a message to the additional base stations that backup timing synchronization information from the additional base stations is no longer needed, the first base station utilizing only the backup timing synchronization information from the second base station to generate the timing signal.

2. The method as recited in claim 1, wherein the first backup timing synchronization information is based on a primary timing synchronization signal the second base station received from a satellite.

3. The method as recited in claim 1, further comprising:
   sending the request as a broadcast or multicast to the others of the plurality of base stations; and
   sending the request over the wired packet-switched communication link in response to a failure associated with a primary timing synchronization signal of the first base station.

4. The method as recited in claim 1, further comprising the first base station receiving the backup timing synchronization information from all of the others of the plurality of base stations coupled in the mesh network.

5. The method as recited in claim 1, wherein the first and second base stations are base stations for macro cells.

6. The method as recited in claim 1, wherein at least one of the plurality of base stations is for serving small cells.

7. A system comprising:
   a plurality of base stations coupled in a mesh network;
   a first base station of the plurality of base stations, the first base station including a first antenna to receive a primary timing synchronization signal and a first interface to a wired packet-based communication link utilized by the mesh network, the first base station configured to transmit first backup timing synchronization information based on the primary timing synchronization signal responsive to a request from a second base station of the plurality of base stations;
   the second base station of the plurality of base stations having a second interface to the wired packet-based communication link and configured to multicast or broadcast the request to others of the plurality of base stations in the mesh network to send backup timing synchronization information responsive to a failure associated with receipt of the primary timing synchronization signal at the second base station; and
   the second base station being further configured to utilize the first backup timing synchronization information sent from the first base station to generate a synchronized timing signal in the second base station;
   wherein the second base station receives additional backup timing synchronization information transmitted over the mesh network from additional base stations of the others of the plurality of base stations; and
   wherein the second base station is configured to send a message to the additional base stations that backup timing synchronization information from the additional base stations is no longer needed to thereby utilize only the backup timing synchronization information from the first base station to generate the synchronized timing signal in the second base station.

8. The system as recited in claim 7, wherein one of the additional base stations is a third base station configured to transmit second backup timing synchronization information based on receipt of the primary timing synchronization signal by the third base station and the request.

9. The system as recited in claim 8 wherein the first, second, and third base stations provide radio coverage for respective first, second, and third macro cells.

10. The system as recited in claim 7 wherein the first base station provides radio coverage for a small cell.

11. A system comprising:
    a plurality of base stations coupled in a mesh network; and
    a first and second antenna associated respectively with a first base station and a second base station of the plurality of base stations to receive a primary timing synchronization signal;
    wherein the first and second base stations of the plurality of base stations broadcast or multicast first and second backup timing synchronization information, respectively, based on the primary timing synchronization signal, over the mesh network on a periodic basis without a request for backup timing synchronization information from another of the plurality of base stations; and
    wherein a frequency of the broadcast or multicast of the first and second backup timing synchronization information over the mesh network varies dynamically according to a size of the mesh network and network bandwidth.

12. The system as recited in claim 11 wherein the mesh network utilizes a packet switched wired communication link coupled to each of the plurality of base stations.

13. The method as recited in claim 1 further comprising:
a third base station of the plurality of base stations responding to the request with a message indicating that the third base station cannot provide the backup timing synchronization information.

\* \* \* \* \*